Figure 1:
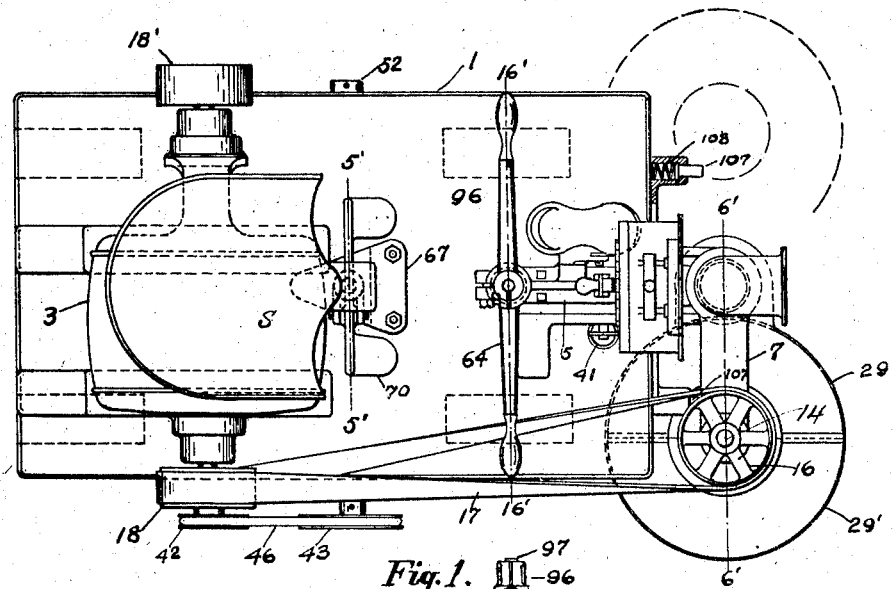

H. W. CHENEY.
FLOOR SURFACING MACHINE.
APPLICATION FILED JULY 26, 1906.

1,013,534.

Patented Jan. 2, 1912.

4 SHEETS—SHEET 1.

Witnesses.

Inventor.
Herbert W. Cheney.

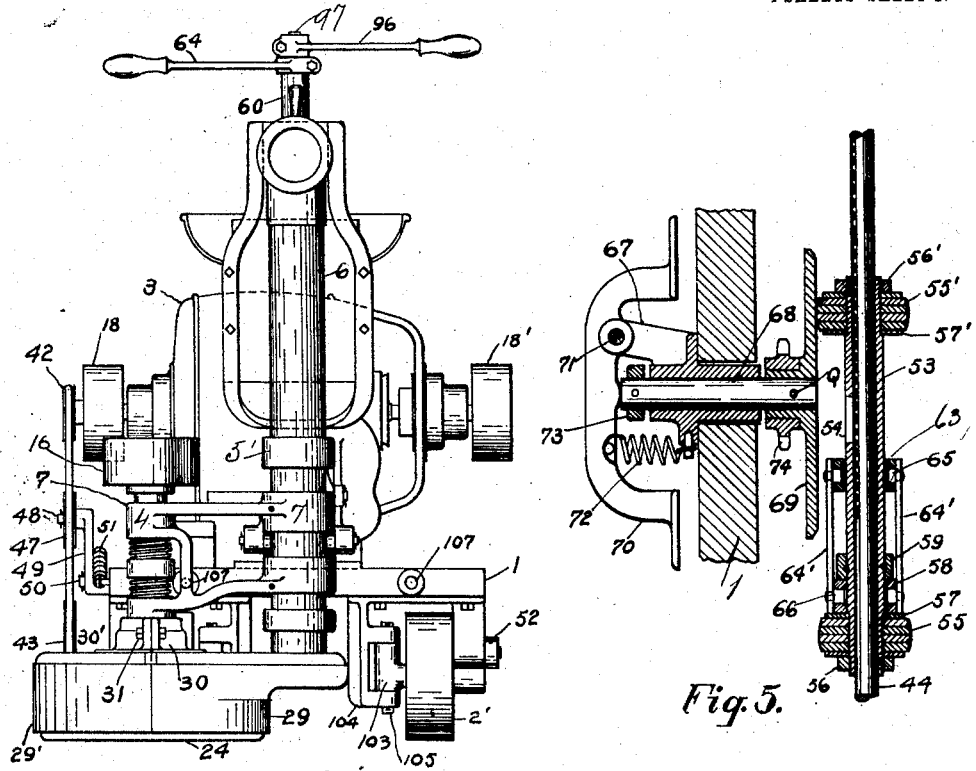

H. W. CHENEY.
FLOOR SURFACING MACHINE.
APPLICATION FILED JULY 26, 1906.
1,013,534.
Patented Jan. 2, 1912.
4 SHEETS—SHEET 4.
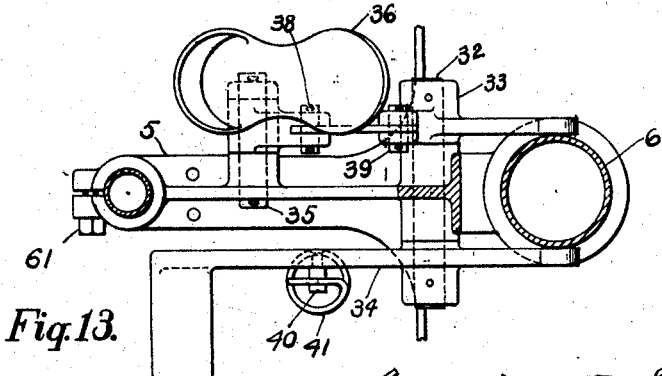
Fig. 13.
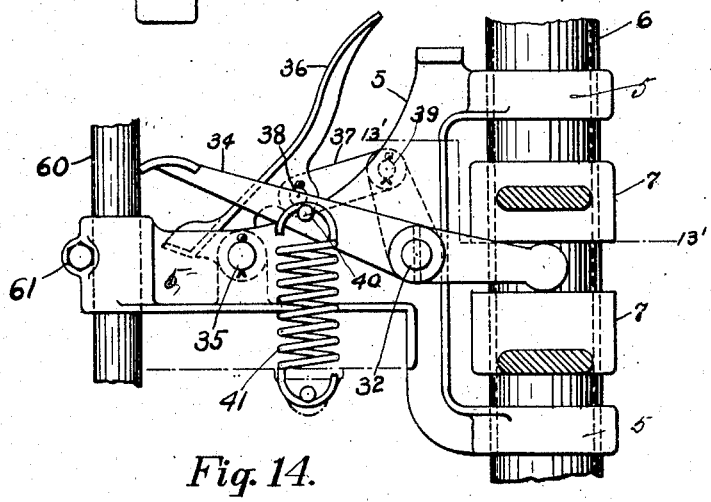
Fig. 14.
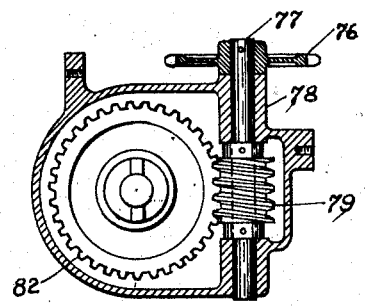
Fig. 15.
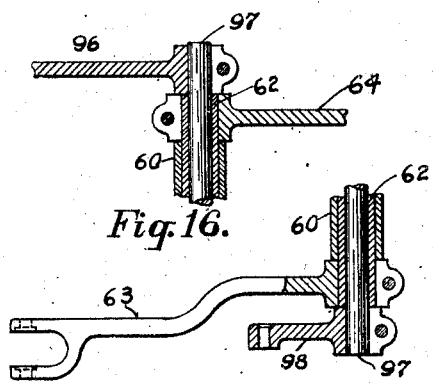
Fig. 16.
Fig. 17.
Witnesses.
inventor.
Herbert W. Cheney

UNITED STATES PATENT OFFICE.

HERBERT W. CHENEY, OF NORWOOD, OHIO.

FLOOR-SURFACING MACHINE.

1,013,534.   Specification of Letters Patent.   Patented Jan. 2, 1912.

Application filed July 26, 1906. Serial No. 327,934.

*To all whom it may concern:*

Be it known that I, HERBERT W. CHENEY, a citizen of the United States, residing at Norwood, in the county of Hamilton and the State of Ohio, have invented a certain new and useful Improvement in Floor-Surfacing Machines; and I declare the following to be a full, clear, and exact description of the invention, such as will enable others skilled in the art to which it appertains to make and use the same.

My invention is designed to provide a novel floor surfacing machine of superior efficiency and utility, having simple and economical construction, durability and convenience in operation, and adapted to clean, polish, surface or level floors having either plain or irregular outlines by the use of motive power.

Among the objects of my invention are, to produce better and more uniform results in the operation of dressing irregular floor surfaces than has been possible heretofore, and to produce a machine in which the direction of movement, degree of pressure and speed of travel of the polishing surface relative to the surface acted upon are under the complete control of the operator at all times, and in which the operating head carrying the polishing surface may be adjusted to operate on either side of the frame of the machine close to the walls and corners of the room, and also in which the operating head will adjust itself automatically to act upon the high points of the floor.

In carrying out the above objects I therefore provide a truck or carriage having a rotatable surfacing disk or polishing head mounted thereon, together with means for driving the surfacing disk and the truck.

In a more specific aspect my invention consists of a floor surfacing machine comprising a rotatable abrasive surface, a motor for rotating said abrasive surface at a constant speed and to feed it over a floor surface, together with means for varying the rate and reversing the direction of feed, and also means to adjust the contact pressure between the abrasive surface and the floor surface.

The invention further consists of an improved fan blower so mounted and arranged relative to the abrasive surface of the floor surfacing machine that it removes all the refuse from the immediate vicinity of said abrasive surface.

The invention also comprises certain improvements in details of construction and combination of parts which will be hereinafter described and particularly pointed out in the appended claims.

Figure 2:
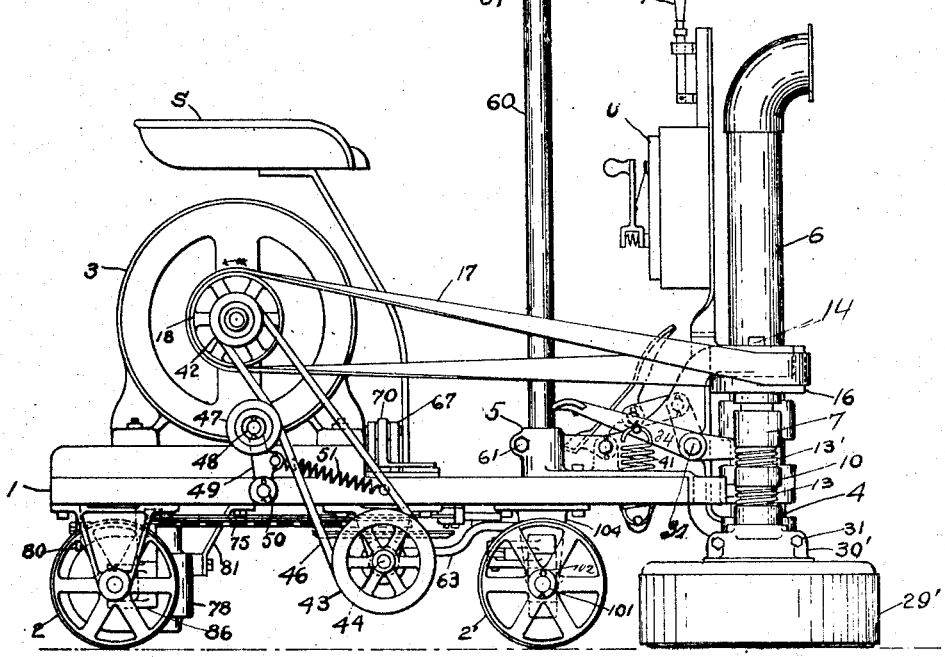
Figure 6:
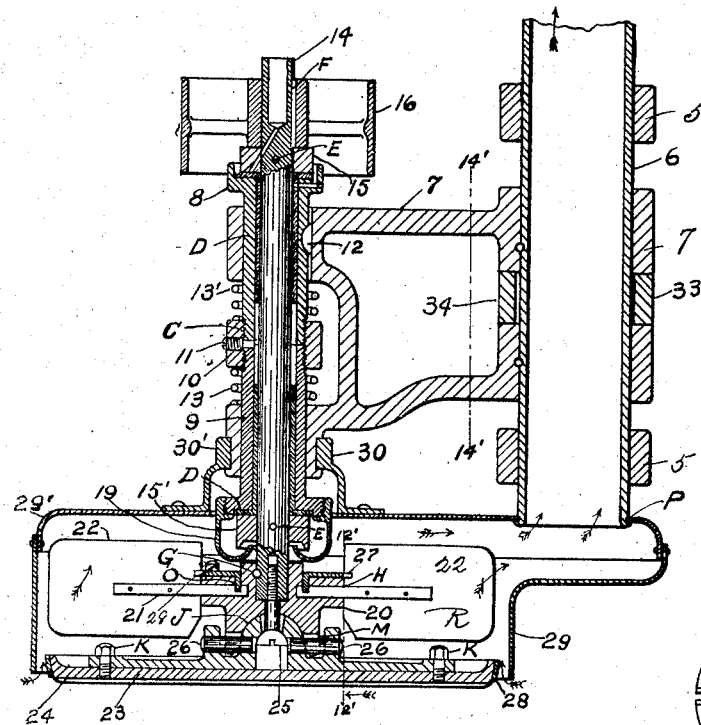
Figure 8:
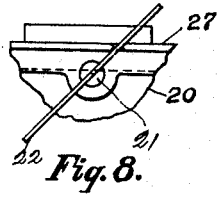
Figure 9:
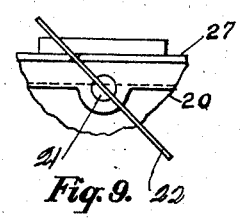
Figure 10:
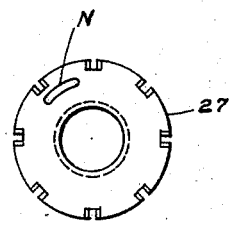
Figure 11:
Figure 7:
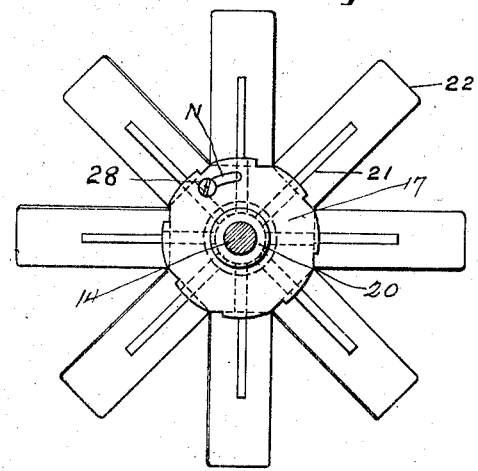
Figure 12:
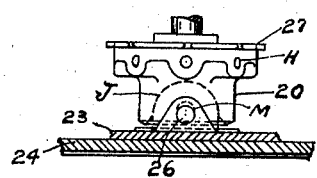

In the accompanying drawings which clearly illustrate the preferred embodiment of my invention Figure 1 is a plan view of the floor surfacing machine showing the parts above the platform and those parts the view of which is not obstructed by the platform, with the positions of the carrying wheels in dotted lines; Fig. 2 is a side elevation of the machine; Fig. 3 is a front elevation; Fig. 4 is a plan view showing the mechanism under the platform with certain parts in section; Fig. 5 is a sectional view through the friction driving mechanism taken on lines 5' 5' Fig. 1 looking toward the rear end of the machine; Fig. 6 is a sectional view through the polishing head and its support taken on line 6' 6' Fig. 1 showing the polishing disk, exhaust fan and related parts; Fig. 7 is a plan view of the exhaust fan in detail; Figs. 8–9 are views showing the two positions to which all the blades of the exhaust fan Fig. 7 may all be simultaneously adjusted; Figs. 10–11 are views showing a detail of the disk forming a part of the exhaust fan Fig. 7, and serving to move and hold the blades in position; Fig. 12 is a view in partial section on line 12' 12' Fig. 6 looking in direction of arrow, showing the flexible or universal joint connection between the polishing disk and the hub or center upon which the blades of the exhaust fan are mounted; Fig. 13 is a plan view of the mechanism for raising or lowering the framework carrying the polishing head, showing certain parts in section taken on line 13' 13' Fig. 14; Fig. 14 is a side elevation of the mechanism shown in plan in Fig. 13 with framework carrying polishing head in section taken on line 14' 14' Fig. 6; Fig. 15 is a sectional view through worm gear case and sprocket wheel on line 15' 15' Fig. 4, showing worm gearing; Fig. 16 is a view showing a partial section through handle levers on line 16' 16' Fig. 1; and Fig. 17 is a view showing a partial section through the steering and speed changing levers at the lower end of the handle lever shafts taken on line 17' 17' Fig. 4.

Similar letters and numerals refer to similar parts throughout the several views.

The carriage of my improved machine consists of the frame or platform 1 mounted on wheels 2 and 2'. Upon the carriage is mounted the motor 3 (shown here as an electric motor), the polishing head 4, the driving and steering gear, and other parts which will be hereinafter described.

I will first describe the polishing head and related parts of my improved machine which comprises in general, a vertical shaft 14, carrying an abrasive polishing disk 24 and a fan R Fig. 7, mounted in bearings 8 and 9 in a frame 7, and an inclosing case 29 for the fan and disk, said frame 7 being rigidly mounted upon a hollow shaft 6. More specifically it consists of a disk 24 Fig. 6, arranged to hold on its face any abrasive or polishing material such as sand paper. The material is clamped on by means of a ring 28 having a tapered fit on the periphery of the disk, said ring being forced on over the edges of the material to be used. The disk 24 is rigidly attached to plate 23 by screws, indicated at K, said plate being flexibly connected to a hub 20 in such a manner as to give in effect a universal joint of limited movement but having a positive drive. This is accomplished in the following manner. A semi-spherical projection, indicated at J, on the plate 23 fits into a corresponding seat in the hub 20, and is held by a special screw 25 also having a semi-spherical head the center of which coincides with the center of the spherical projection on plate 23. The hole in said plate is slightly larger than the body of the screw to allow for a limited movement of the plate in its seat. Pins 26 are rigidly secured in lugs in plate 23 and engage with slots in the rim of hub 20, as indicated at M Figs. 6 and 12, thus serving as a positive drive for the plate from hub 20. The hub 20 is rigidly pinned to shaft 14, as indicated at G. The shaft 14 runs in bearings 8 and 9 which are flexibly mounted in frame 7 so as to have a slight vertical movement with reference to the frame 7, said bearing having threaded ends, indicated at C, to receive a threaded collar 10 which serves to hold the bearing bushings rigidly together as one piece. The relation of the bushings 8 and 9 and the collar 10 being finally maintained by the special screw 11. The bushings 8 and 9 are kept from turning in the frame 7 by a sliding key or feather 12 and are lined with any suitable bearing metal such as babbitt, indicated at D. Stiff springs 13—13' are interposed between the collar 10 and the frame 7 and serve to allow a slight vertical movement between the bearings 8 and 9 and the frame 7. The shaft 14 is held against end-wise movements with reference to the bearings 8 and 9 by the thrust collars 15—15' which are rigidly pinned to the shaft as indicated at E. A pulley 16 is rigidly keyed to the shaft as indicated at F and serves to drive the shaft. On the lower end of bearing 9 a cylindrical drip cup 19 is screwed and arranged to catch the oil that runs out of the bearings.

The hub 20 has radial holes indicated at H to receive the shanks 21 of the fan blades 22. A toothed disk 27 serves to hold the fan blades in a given relation to hub 20 and to move them simultaneously to different angular positions as shown in Figs. 8 and 9. This may be accomplished by loosening the binding screw 28 which passes through the slot, indicated at N, and turning one of the blades 22 to the desired angle. It is obvious that the other blades will all assume the same angle. This allows the fan to be rotated in either direction and by proper adjustment cause it to give a flow of air in the direction of arrows Fig. 6 with either direction of rotation. The plate 27 also serves to hold the shanks 21 of the fan blades 22 against centrifugal force tending to withdraw them from the holes in the hub 20. A flange on plate 27 normally sets into an annular groove in hub 20 and also into a slot in the end of the shank 21 as indicated at O. A split cover 29—29' incloses the fan and polishing disk and is held in place by the split bracket 30—30' resting in an annular groove in the hub of frame 7 and fastened together by bolts 31. The part of the cover 29 is also fixed to the hollow shaft 6, as indicated at P. It is obvious that the part of the cover 29' may be removed by removing the bolts 31, making the fan R Fig. 7 and polishing disk 24 accessible.

The polishing head may be adjusted in a vertical direction at the will of the operator to increase or diminish the contact pressure between the polishing head and the floor or to raise it clear of the floor by the following means: A rod 32 having a bearing and free to turn in bracket 5 has a lever 33 rigidly pinned at one end and a foot lever 34 rigidly pinned at the other end. Said levers engage with the frame 7 on either side of the hollow shaft 6 and serve to raise or lower said hollow shaft and the polishing head mounted thereon with relation to the platform 1. A pin 35, rigidly mounted in bracket 5, acts as a fulcrum for a foot lever 36 which engages with a link 37 by means of a fulcrum pin 38. Said link engages at the other end with lever 33, through fulcrum pin 39. It will be noted that the arrangement of these parts is such as to give a toggle action so that when pressure is applied on lever 36 the pressure will be greatly increased at lever 33 tending to force the polishing head down in contact with the floor. In lever 34 a pin 40 is rigidly fixed and forms a support for one end of a counterbalancing spring 41, the other end of said spring being supported on frame 1. This spring should preferably be made of sufficient strength to nearly counterbalance the weight of the hollow shaft 6 and the polishing head attached thereto. It will be noted that when pressure is applied to foot lever 34 the polishing head will be raised from the floor. A plunger 107 backed by a compression spring 108 mounted in the bracket 5 as shown in Fig. 1 engages with the frame 7 to form a cushion for the polishing head in case it should come in contact with an obstruction, and also to act as a belt tightener for the belt 17 which connects the polishing head and the motor 3.

I will now describe the driving and reversing gear for transmitting power to propel the carriage of my improved floor surfacing machine which comprises in general of motor driven friction wheels engaging with a friction disk from which motion is transmitted to the driving wheels through chain and sprocket and worm gearing; and a hand lever to change the position of the friction wheels relative to the disk, and to disengage the gearing from the driving wheels. More specifically a grooved pulley 42 rigidly mounted on the shaft of motor 3 drives a grooved pulley 43, rigidly mounted on the shaft 44 which shaft is mounted in bearings 45 supported on the frame 1, through the round belt 46, tension on said belt being maintained by a belt tightener consisting of the loose pulley 47 mounted on a stud 48 which is riveted into an arm 49 which arm is pivoted on the stud 50, said stud being rigidly bolted to the frame 1. A spring 51 has one end secured to frame 1 and the other end attached to arm 49 in such a manner as to keep the pulley 47 in contact with belt 46 and take up the slack therein. The end play of the shaft 44 is taken up by the collar 52 fixed to said shaft and by the hub of pulley 43. A sleeve 53 is slidably mounted on the shaft 44 and is driven thereby by means of the sliding feather or key 54 engaging with a spline in shaft 44. Upon the sleeve 53 two friction wheels 55—55' are rigidly mounted, said wheels being preferably constructed of layers of raw hide, as indicated in Fig. 5, said raw hide being securely clamped in position by the nuts 56—56' and washers 57—57', said washers being securely keyed to the sleeve 53. Mounted loosely on sleeve 53 is a collar 58 which is held against end play on the sleeve by collar 59 said collar being securely pinned to the sleeve. In bracket 5 a pipe 60 is rigidly clamped, by means of the screw 61, and serves as a support for the operating levers hereinafter described. A hollow shaft 62 having a bearing in, and extending through the pipe 60 has a lever 63 securely clamped to it at its lower end underneath the platform, as indicated in Fig. 17 and a speed changing hand lever 64 securely clamped to its upper end, as indicated in Fig. 16. At the outer end of lever 63 which is forked, as shown in Fig. 17, two links 64' are pivotally engaged by means of the studs 65. The other end of said links being pivotally engaged on diametrically opposite sides of the collar 58 by means of the studs 66. It will be understood from the arrangement of parts shown that a movement of the lever 64 will change the position of the sleeve 53 longitudinally on the shaft 44. A bracket 67, bolted to the frame 1, serves as a bearing for a shaft 68, which shaft has slight end play in its bearing. A friction disk 69 is rigidly mounted on the lower end of the shaft 68 underneath the platform 1, and during operation of the machine engages with one of the friction wheels 55—55'. A foot lever 70, fulcrumed on the pin 71 rigidly mounted in the bracket 67, engages with the top end of shaft 68, as indicated in Fig. 5, and serves as means to increase or diminish the pressure between the friction disk 69 and the friction wheels 55—55'. A tension spring 72, having one end secured to the lever 70 and the other end secured to the bracket 67, normally tends to force the friction disk downward against one of the friction wheels 55—55'. A collar 73, rigidly pinned to the shaft 68, serves to limit the downward movement of the shaft as shown in Fig. 5. A sprocket wheel 74 is rigidly pinned to the hub of the friction disk 69 and to the shaft 68, as indicated at Q. A driving chain 75 connects said sprocket wheel to a second sprocket wheel 76 which is rigidly fixed to the worm shaft 77. Said worm shaft has bearings in the gear bracket 78 and has a worm 79 rigidly pinned to it, as indicated in Fig. 15. The gear bracket 78 is supported by the V shaped bar 80 and the bent bar 81, which bars are attached to it and to the frame 1 by cap screws, as indicated in Fig. 2. The worm wheel 82 is loosely mounted on the shaft 83 and engages with the worm 79. The shaft 83 is mounted in brackets depending from frame 1. Said worm wheel has on one side a shouldered hub which fits freely into an opening in the gear bracket 78, and on the other side the gear bracket cover 84 rests against the other end of the hub, thus holding the worm wheel against lateral movement on the shaft 83. A sleeve 85 slidably engages with shaft 83 and serves to drive the shaft by means of a feather which is secured in said sleeve and engages with a spline in the shaft. The hub of the worm wheel 82 has teeth to form a clutch and the sleeve 85 has similar teeth to match. The wheels 2 are rigidly keyed to the axle 83. It is obvious that the worm wheel will drive the wheels 2 and thus move the machine along when the sleeve 85 engages with it, and that the worm wheel 82 and driving wheels may move independently when said sleeve is disengaged with the worm wheel.

A forked lever 86 having rollers 87 mounted thereon which engage in an annular groove in sleeve 85, as indicated at R, serves to move said sleeve into or out of engagement with the worm wheel. The forked lever 86 is rigidly pinned to a rod 88 which has a bearing in a lug on the gear bracket 78. On the upper end of the rod 88 a lever 89 is rigidly pinned. A tension spring 90, fastened at one end to the lever 89 and at the other end to the frame 1, serves to hold the sleeve 85 normally out of engagement with the worm wheel 82. A lever 91 fulcrumed on a stud 92 which is rigidly attached to frame 1, has at one end a roller 93 which engages with the plate 94 on lever 63. The link 95 is pivotally connected at one end to the lever 89 and at the other end to lever 91. A notch plate 94 is arranged so that at a certain position of lever 63, corresponding to the position at which neither of the friction wheels 55—55′ are in engagement with friction disk 69, the spring 90 will pull the sleeve 85 out of engagement with the worm wheel 82 and the roller 93 into the notch in plate 94. It is obvious from this arrangement that when lever 64 is moved to bring the friction wheels 55—55′ and friction disk 69 into engagement, the sleeve 85 and worm wheel 82 will also be brought into engagement. The roller 93 also further serves to define the position of lever 64 when the friction wheels 55—55′ and the disk 69 are out of engagement.

The steering mechanism of my improved machine consists of the following parts: A handle lever 96 is securely clamped to a rod 97, said rod having a bearing and extending through the hollow shaft 62. At the lower end of rod 97 a lever 98 is securely fixed. The outer end of the lever 98 is pivotally engaged with a connecting bar 99 by means of the pin 100. The wheels 2′ are mounted loosely on studs 101 and held on by cotter pins 102. Each stud 101 is rigidly supported in a lever 103, which is pivotally supported in the supporting bracket 104 by means of a pin 105. A projecting arm on each lever 103 engages with the connecting bar 99 by means of the pin 106. It is obvious from this arrangement that a movement of the lever 96 swivels the brackets 103 about the pin 105 and changes the relation of the wheels 2′ to the frame 1, as indicated in Fig. 4.

Referring to Fig. 1, it will be noted that the complete polishing head may be moved to the position 180° from that shown to the position indicated by the dotted lines so as to allow the machine to work over the complete surface of any given area to advantage.

The operation of the machine is as follows:—The operator may sit on the seat S, shown in Fig. 2. A switch T and a motor starter U when closed connect the motor with the mains supplying the energy. The motor 3 drives the polishing disk 24 and fan Fig. 7 at a high rate of speed through the pulley 18, belt 17, pulley 16 and shaft 14. The motor also drives the shaft 44 through the pulleys 42, belt 46 and pulley 43. When the handle lever 64 is in a central position, as shown in Fig. 1, neither of the friction wheels 55—55′ engage with the friction disk 69 and the sleeve 85 is out of engagement with worm wheel 82, as heretofore described, and the machine is not propelled in either direction. If it is desired that a forward movement of the machine over the floor surface be obtained the lever 64 is moved slightly away from the operator which brings friction wheel 55′ into engagement with the greatest diameter of friction disk 69 and engages the clutch on the rear axle 83, driving the machine slowly at first through the gearing heretofore described. It is obvious that a further gradual movement of the handle lever 64 increases the speed of the machine gradually over the range of speed desired. During movement of the lever 64 the pressure between the friction driving wheels may be relieved if desired by use of the foot lever 70. If it is desired that a backward movement over the floor surface be obtained the lever 64 is moved toward the operator, bringing friction wheel 55 into engagement with the opposite periphery of friction disk 69 thus driving the machine slowly in a backward direction. It will be understood from the arrangement shown that the same range of speeds may be had either forward or backward. When it is desired to bring the polishing head in position to do work the lever 36 may be depressed with the left foot of the operator. When it is desired to have the polishing head clear the floor the lever 34 may be depressed with the right foot of the operator. If a more positive drive of the machine over the surface of the floor is desired the lever 70 may be depressed with the right foot of the operator. In the operation of polishing or surfacing a floor the fan Fig. 7 creates a draft of air in the direction of arrows indicated in Fig. 6 carrying the dust and refuse up through the pipe 6. A porous bag or other receptacle (not shown) may be attached to the end of the pipe 6 to receive the refuse. It will be noted that with the arrangement of belt 17 and the pulleys with which it engages the belt will stay on the pulleys only when the motor rotates in the direction indicated by the arrow Fig. 2. When it is desired to operate the machine with the polishing head to the left of the operator, as indicated by dotted lines in Fig. 1, the belt 17 is first removed. The polishing head is then swung around 180° on its pipe support 6 and is driven from pulley 18' through the belt 17. The polishing disk will then rotate in the opposite direction from that obtained when operated as shown, and the fan Fig. 7 may be changed as heretofore described to produce an upward flow of air through the pipe 6.

I am aware of the fact that machines have been constructed embodying some of the features described in this specification and I do not claim such features broadly. I also wish to have it understood that I do not limit my invention to the exact details shown, as they may, in a measure, be departed from without in any wise departing from the spirit of my invention.

Having described my invention, what I claim is:—

1. In a floor surfacing machine, the combination of a carriage, a rotatable member supported thereon, said member being provided with an abrasive surface, a motor mounted on said carriage to rotate the abrasive surface and to propel the carriage, and means under the control of a single operating handle for controlling the speed of said carriage and for reversing its direction of movement without affecting the speed of rotation of said abrasive surface.

2. In a floor surfacing machine, the combination of a truck having a driving member, a rotatable abrasive disk, an electric motor for rotating the disk and for propelling the truck, means for connecting the motor to said disk, independent means for connecting the motor to the driving member and for varying the speed of said driving member, a single handle for operating said last mentioned means, and means for adjusting the abrasive disk vertically in relation to the truck for varying the contact pressure between the disk and the floor surface and for lifting the disk away from the floor surface.

3. In a floor surfacing machine, the combination of a rotatable abrasive disk, a motor to rotate the disk and to feed it over the floor surface, connections whereby the motor may drive the disk at a constant speed, independent means for varying the speed at which the disk is fed over the floor surface, and means for adjusting the disk while rotating to increase or diminish the contact pressure of said disk upon the floor surface.

4. In a floor surfacing machine, the combination of a carriage, a rotatable abrasive surface resiliently supported on the carriage, a motor to rotate the abrasive surface at a constant speed and propel the carriage, friction means controlled by a single handle to change the speed and reverse the direction of movement of the carriage without affecting the speed of rotation of the abrasive surface, and means for guiding the movements of the carriage over the floor surface.

5. In a floor surfacing machine, the combination of a carriage, a shaft mounted thereon, an abrasive rotating disk flexibly mounted on the shaft, a fan rigidly mounted on the shaft, and a single housing inclosing the abrasive rotating disk and the fan, said housing being divided in a plane parallel or coinciding with the center of the shaft.

6. In a floor surfacing machine, the combination of a carriage, a vertical shaft supported by the carriage, a rotatable abrasive disk mounted upon and driven by the shaft, and having its plane normally at a right angle to the shaft but adapted to move into positions at different angles thereto, single means to rotate the shaft and propel the carriage, and means for controlling the speed of the carriage independently of that of said shaft.

7. In a floor surfacing machine, the combination of a shaft, a rotatable abrasive surface and a fan mounted upon and driven by the shaft, bearings for the shaft, a frame to support the bearings, and a flexible connection between the bearings and the frame allowing endwise movement of the bearings and shaft in the frame.

8. In a floor surfacing machine, the combination of a shaft, a rotatable abrasive disk mounted on and driven by the shaft, bearings for the shaft, a frame to support the bearings, thrust collars on the shaft to limit end play in the bearings, and a spring connection between the bearings and frame to allow endwise movement of the shaft and bearings relative to the frame.

9. In a floor surfacing machine, the combination of a carriage, a hollow shaft supported thereby, a frame rigidly mounted on said hollow shaft, a polishing head supported by said frame, a housing for said polishing head, and means for driving air through the hollow shaft to conduct away the refuse from said polishing head.

10. In a floor surfacing machine, the combination of a carriage, a hollow shaft having bearings in the carriage, a frame rigidly mounted on the hollow shaft and pivotally mounted on said carriage, and adapted to be swung into different positions relative thereto, a polishing head rotatably mounted on said frame, a housing for said polishing head, means to rotate the polishing head, and means to drive air through said hollow shaft.

11. In a floor surfacing machine, the combination of a carriage, a frame pivotally mounted on said carriage and adapted to be swung into different positions relative thereto, a polishing head rotatably mounted in said frame, means to rotate the polishing head, and a lever on the carriage coöperating with the frame to raise and lower the frame and polishing head relative to the carriage.

12. In a floor surfacing machine, the combination of a carriage, a bracket mounted thereon, a frame carrying a polishing head pivotally and adjustably supported by the bracket, a lever to raise the frame, levers forming a toggle joint to lower the frame, and a counterbalance tending normally to raise the frame in relation to the bracket.

13. In a floor surfacing machine, the combination of a carriage, a rotatable polishing head supported on a frame attached to the carriage and capable of movement relative thereto, a motor to rotate the polishing head, and means arranged to act as a buffer between said frame and the carriage.

14. In a floor surfacing machine, the combination of a carriage, a frame carried thereby and movable relative thereto, a polishing head rotatably mounted on said frame, a motor, a belt connecting said motor to said polishing head, and a buffer spring between the frame and the carriage and acting as a belt-tightener.

15. In a floor surfacing machine, the combination of a frame, a shaft supported in bearings in the frame, means to rotate the shaft, an abrasive surface and a fan mounted upon and driven by the shaft, and a single segmentally divided inclosing casing for the abrasive surface and fan in communication with a vertical air duct.

In testimony whereof I affix my signature in the presence of two witnesses.

HERBERT W. CHENEY.

Witnesses:
AD. E. MONTHEIM,
WM. H. BUCKTON.